United States Patent
Zheng et al.

(10) Patent No.: US 12,034,477 B2
(45) Date of Patent: Jul. 9, 2024

(54) METHOD FOR LABELING OPTICAL FIBER WAVELENGTH

(71) Applicant: HENGXIN SEMITECH CO., LTD., Suzhou (CN)

(72) Inventors: Jiajun Zheng, Suzhou (CN); Minjie Wu, Suzhou (CN); Minghui Wang, Suzhou (CN); Jun Zhou, Suzhou (CN); Jili Zhang, Suzhou (CN)

(73) Assignee: HENGXIN SEMITECH CO., LTD., Suzhou (CN)

( * ) Notice: Subject to any disclaimer, the term of this patent is extended or adjusted under 35 U.S.C. 154(b) by 144 days.

(21) Appl. No.: 17/642,831

(22) PCT Filed: Aug. 3, 2021

(86) PCT No.: PCT/CN2021/110239
§ 371 (c)(1),
(2) Date: Mar. 14, 2022

(87) PCT Pub. No.: WO2022/179051
PCT Pub. Date: Sep. 1, 2022

(65) Prior Publication Data
US 2023/0353239 A1    Nov. 2, 2023

(30) Foreign Application Priority Data

Feb. 26, 2021   (CN) .......................... 202110218138.9

(51) Int. Cl.
*H04B 10/00*  (2013.01)
*H04B 10/077*  (2013.01)

(52) U.S. Cl.
CPC ................. *H04B 10/0775* (2013.01)

(58) Field of Classification Search
CPC ............ H04B 10/0775; H04B 10/0773; H04B 10/516; H04B 10/541; H04B 10/6164;
(Continued)

(56) References Cited

U.S. PATENT DOCUMENTS 6,922,431 B1 * 7/2005 Weber ................ H04J 14/0298
375/130
7,702,245 B1 * 4/2010 Mork ................. H04B 10/0773
375/147
(Continued)

FOREIGN PATENT DOCUMENTS

CN           1581756 A      2/2005
CN         102170310 A      8/2011
(Continued)

*Primary Examiner* — Hanh Phan
(74) *Attorney, Agent, or Firm* — SZDC Law PC (57) ABSTRACT

The invention provides a method for labeling an optical fiber wavelength, including: deploying a spreading code on each of a transmit end and a receive end; transmitting a message code, and spreading the message code by using the spreading code of the transmit end; and performing envelope modulation on an optical signal by using the spread message code, transmitting the optical signal after the envelope modulation to the receive end, choosing, the spreading code of the receive end to despread the message code to obtain the original message code of the transmit end, and obtaining a corresponding wavelength according to the spreading code of the receive end. A spreading code having a correspondence with a wavelength is used to spread and despread a message code, and a modulation depth of an amplitude modulated signal may be greatly reduced to nearly prevent an envelope modulated signal from affecting a main signal.

9 Claims, 8 Drawing Sheets

(58) Field of Classification Search
CPC .. H04B 10/58; H04B 10/6161; H04B 10/116; H04B 10/2507; H04J 14/007; H04J 14/005; H04J 14/02
USPC ......... 398/77, 78, 79, 33, 58, 172, 158, 159, 398/183, 135, 136, 137, 138, 139, 202, 398/208, 209; 375/130, 146, 147
See application file for complete search history.

(56) References Cited

U.S. PATENT DOCUMENTS

2005/0019040 A1* 1/2005 Trutna ................. H04B 10/58
398/183
2012/0076497 A1 3/2012 Li

FOREIGN PATENT DOCUMENTS

CN 102624479 A 8/2012
CN 113037678 A 6/2021

* cited by examiner

| Wavelength | Walsh Code (Hex) | m code (Hex) | |
|---|---|---|---|
| | | Run length =5 | Run length =4 |
| $\lambda_1$ | CCCC3333 | 221F6B | 3C6A2D |
| $\lambda_2$ | 99996666 | F72D04 | F48A1D |
| $\lambda_3$ | F0F00F0F | 8D79E0 | 8594E7 |
| $\lambda_4$ | A5A55A5A | 79C750 | 08F2B7 |
| $\lambda_5$ | C3C33C3C | 4CF8E1 | 9BCD88 |
| $\lambda_6$ | 96966969 | 3E8D64 | 57095B |
| $\lambda_7$ | CC3333CC | C427D9 | 8CA567 |
| $\lambda_8$ | 99666699 | C1D23D | 5B225E |
| $\lambda_9$ | F00F0FF0 | 779990 | E3866A |
| $\lambda_{10}$ | A55A5AA5 | 2E147D | 1A34F5 |
| $\lambda_{11}$ | C33C3CC3 | 58657C | 942737 |
| $\lambda_{12}$ | 96696996 | 3A17D1 | 87790D |
| $\lambda_{13}$ | | 58D21F | BC2C55 |
| $\lambda_{14}$ | | 15F436 | B643AA |
| $\lambda_{15}$ | | 73E8A8 | 5D2F24 |
| $\lambda_{16}$ | | 4873E6 | DD0996 |
| $\lambda_{17}$ | | 2F8CD4 | CED50C |
| $\lambda_{18}$ | | 7CA11D | EC62F0 |
| $\lambda_{19}$ | | C1DDB0 | 89AA67 |
| $\lambda_{20}$ | | 7D48F0 | 6F4D84 |
| $\lambda_{21}$ | | BD3883 | E99970 |
| $\lambda_{22}$ | | F8942D | 98E497 |
| $\lambda_{23}$ | | F7C822 | 0DD971 |
| $\lambda_{24}$ | | C2C667 | A89C57 |
| Reserved | | FA242E | 6D8F28 |

METHOD FOR LABELING OPTICAL FIBER WAVELENGTH

This application is the National Stage Application of PCT/CN2021/110239, filed on Aug. 3, 2021, which claims priority to Chinese Patent Application No. 202110218138.9, filed on Feb. 26, 2021, which is incorporated by reference for all purposes as if fully set forth herein.

FIELD OF THE INVENTION

The present invention relates to the field of optical fiber communication technologies, and more particularly to a method for labeling an optical fiber wavelength.

DESCRIPTION OF THE RELATED ART

In optical fiber communication, wavelength division multiplexing is widely used to increase the capacity of a single optical fiber. To effectively track and manage wavelengths of optical waves used in communication networks, it is certainly convenient to make each optical wave carry its own wavelength information. At present, an envelope modulated signal is usually used to label an optical fiber wavelength. That is, a low-frequency sinusoidal signal with a small amplitude is superimposed on each wavelength, and the presence or absence of a sinusoidal signal can convey low-speed digital information. The frequency of the low-frequency sinusoidal signal is used to label the wavelength. That is, the wavelength carries its own wavelength information through the envelope modulated signal.

Figure 1:
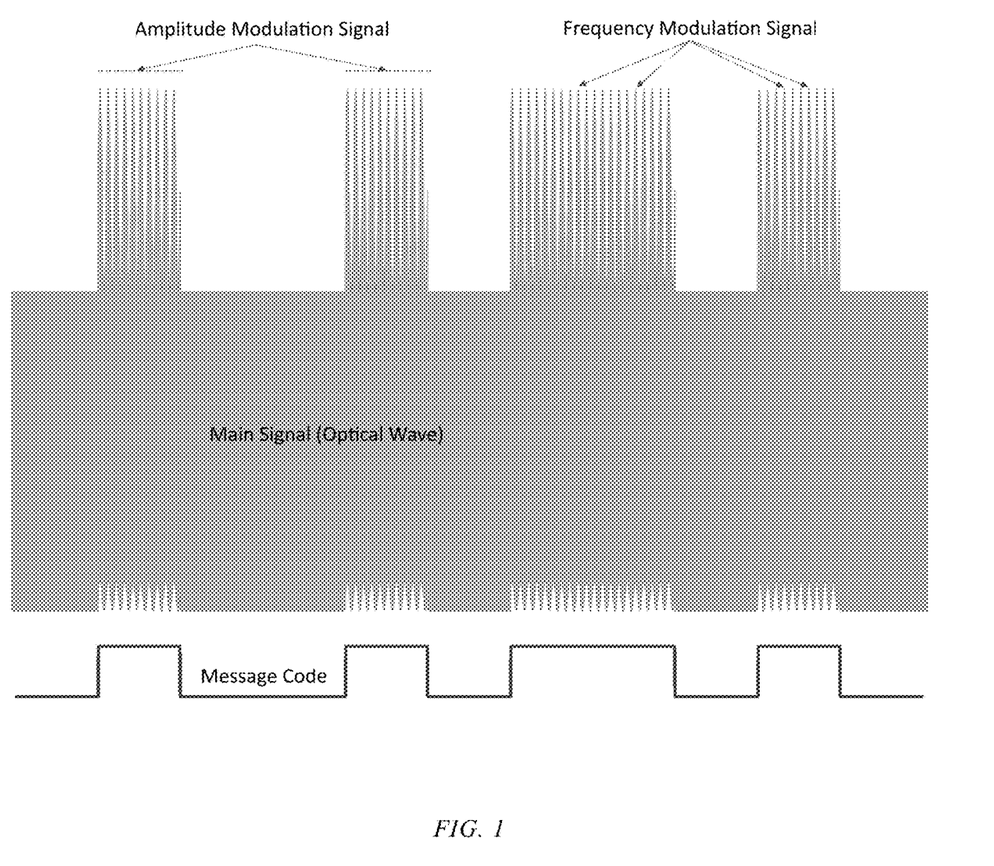
FIG. 1 is a schematic diagram of an optical wave signal after envelope modulation in the prior art.

An optical wave signal after envelope modulation is shown in FIG. 1. A frequency modulated signal after the envelope modulation is the superimposed low-frequency sinusoidal signal. The presence or absence of the frequency modulated signal is equivalent to an amplitude modulated signal after the envelope modulation. Because of a specific circuit implementation, both the top and bottom of an optical wave are modulated, and a modulation amplitude at the top is greater than a modulation amplitude at the bottom. An envelope modulation amplitude is consistent with an envelope modulated message code. The message code may be generated by performing some type of encoding on a message source (for example, Manchester encoding).

Figure 2:
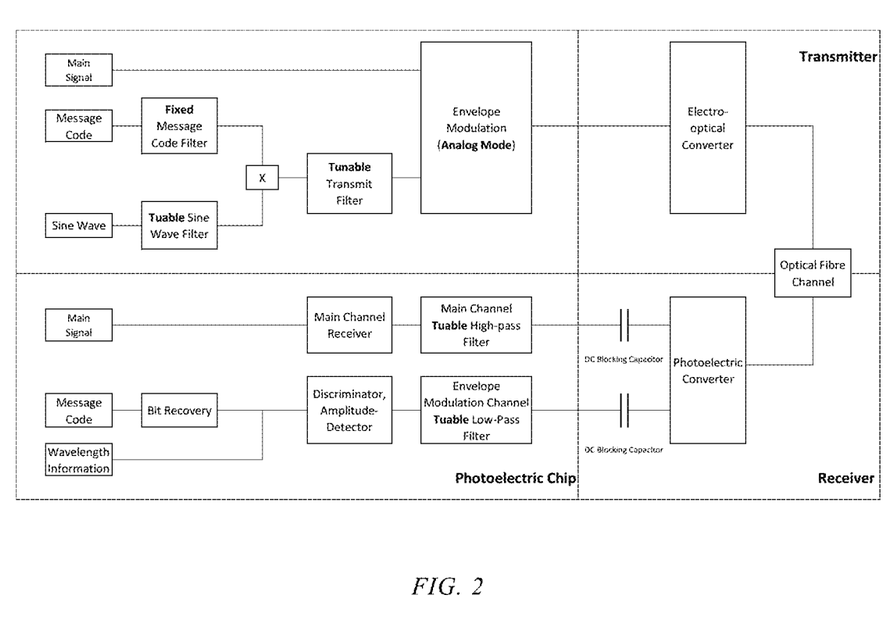
FIG. 2 is a diagram of the principle that can implement the modulation and demodulation of an envelope modulated signal with a low-speed sinusoidal signal in the prior art.

FIG. 2 is a diagram of the principle that can implement the modulation and demodulation of an envelope modulated signal with a low-speed sinusoidal signal. When amplitude modulation is performed on a main signal, damage is caused to the quality of the main signal, resulting in reduced sensitivity of a receive end. From the perspective of frequency domain, the spectrum of a signal generated after envelope modulation is a result of convolution of the spectrum of the envelope modulated signal and the spectrum of the main signal. The envelope modulated signal includes both the spectrum of a low-speed digital signal and a low-frequency sinusoidal signal used to label a wavelength. As a result, the spectrum of a finally generated signal differs significantly from the spectrum of the original main signal.

Figure 3:
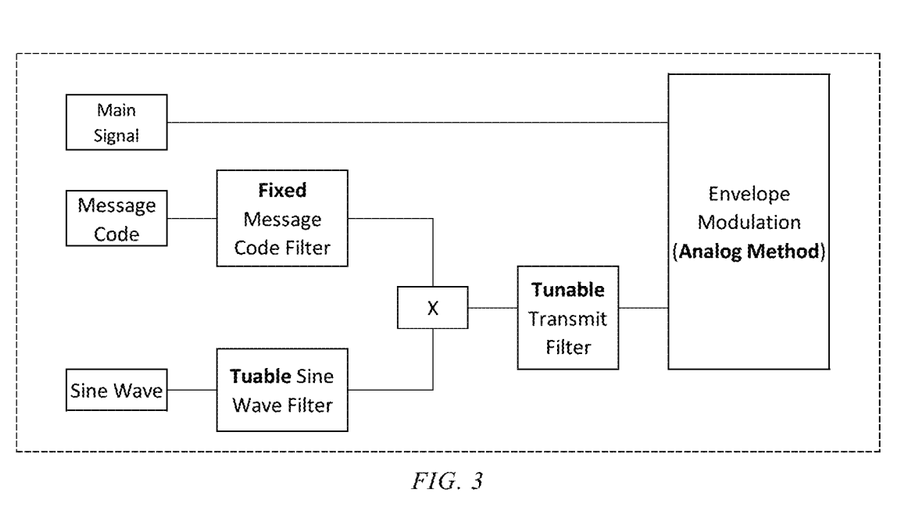
FIG. 3 is a partial schematic enlarged view of FIG. 2.

To reduce the impact of an envelope modulated signal on a main signal, a transmit low-pass filter usually needs to be added to an envelope modulated signal path to filter out higher harmonics of an amplitude modulated signal and a sinusoidal signal. However, because the frequency of the sinusoidal signal used to label a wavelength has a wide range of variation, the bandwidth of the added transmit low-pass filter needs to be variable. Because the frequency of this sinusoidal signal is much wider than the spectrum of the amplitude modulated signal after envelope modulation, the higher harmonics of the amplitude modulated signal after the envelope modulation fail to be effectively filtered out, unless a message code low-pass filter is added after the amplitude modulated signal and before multiplication with the sinusoidal signal, which undoubtedly increases the complexity of a system and the difficulty of implementation, as shown in FIG. 3.

SUMMARY OF THE INVENTION

For this, a technical problem to be resolved by the present invention is to resolve the problems of a damaged main signal and high hardware implementation difficulty that are caused by a sinusoidal signal used for labeling a wavelength in the prior art.

To resolve the foregoing technical problems, in a first aspect, the present invention provides a method for labeling an optical fiber wavelength by a transmit end. The method includes:
  deploying a spreading code on each of a transmit end and a receive end;
  transmitting a message code, and spreading the message code by using the spreading code of the transmit end; and
  performing envelope modulation on an optical signal by using the spread message code, transmitting the optical signal after the envelope modulation to the receive end, choosing, by the receive end, the spreading code of the receive end to despread the message code to obtain the original message code of the transmit end, and obtaining a corresponding wavelength according to the spreading code of the receive end.

In an embodiment of the present invention, a correspondence is established between each of the spreading code of the transmit end and the spreading code of the receive end and a corresponding wavelength in a wavelength table.

In an embodiment of the present invention, the spreading code is an orthogonal code or a pseudorandom sequence.

In an embodiment of the present invention, the spreading the message code by using the spreading code of the transmit end includes:
  defining a code element of the message code as "0" and/or "1";
  selecting a spreading code $x=(x_1, x_2, x_3, \ldots, x_i, \ldots, x_n)$, where $x_i \in \{-1,+1\}$, i=1, 2, 3, ... n; and
  when the message code is "0", outputting the spreading code $x_i$, and when the message code is "1", negating the spreading code $x_i$ for output.

In an embodiment of the present invention, the choosing, by the receive end, the spreading code of the receive end to despread the message code includes:
  choosing the spreading code of the receive end, and performing sliding despreading on the received spread message code by using the spreading code of the receive end, where when the spreading code of the receive end is the same as the spreading code of the transmit end, the original message code of the transmit end is accurately demodulated.

In an embodiment of the present invention, the performing sliding despreading on the received spread message code by using the spreading code of the receive end includes:
  multiplying the spreading code of the receive end by the received spread message code bit by bit, calculating a nonnormalized cross-correlation coefficient between two bits "0" and "1", and determining, according to the cross-correlation coefficient between the two bits, whether the spreading code of the receive end is the same as the spreading code of the transmit end.

In an embodiment of the present invention, the calculating a nonnormalized cross-correlation coefficient between two bits "0" and "1", and determining, according to the cross-correlation coefficient between the two bits, whether the spreading code of the receive end is the same as the spreading code of the transmit end includes:

defining a threshold; and separately adding all code elements of the two bits "0" and "1" to calculate the cross-correlation coefficient between the two bits, and determining whether the cross-correlation coefficient is within a range of the threshold, where if a determination result is no, the spreading code of the receive end is the same as the spreading code of the transmit end; or if a determination result is yes, the spreading code of the receive end is different from the spreading code of the transmit end.

In an embodiment of the present invention, after it is determined that the spreading code of the receive end is different from the spreading code of the transmit end, it continues to be determined whether a sliding distance of the spreading code of the receive end is equal to a bit width of the spreading code, and if a determination result is yes, the spreading code of the receive end is changed to continue to perform the step of sliding spreading, or if a determination result is no, the original spreading code of the receive end is used to continue to perform the step of sliding spreading.

A second aspect of the present invention provides a method for demodulating an optical fiber wavelength labeled by a transmit end by a receive end. The method includes:

receiving, by a receive end for receiving an optical signal resource, an optical signal after envelope modulation of a transmit end;

removing an optical wave of the optical signal to obtain a spread message code of the transmit end; and choosing the spreading code of the receive end, performing sliding despreading on the received spread message code by using the spreading code of the receive end, when the spreading code of the receive end is the same as the spreading code of the transmit end, obtaining the original message code of the transmit end, and obtaining a corresponding wavelength according to the spreading code of the receive end.

A third aspect of the present invention provides a method for labeling an optical fiber wavelength by a system. The system includes a transmit end and a receive end. The method includes:

performing, by the transmit end, the following steps:

deploying a spreading code on each of the transmit end and the receive end;

transmitting a message code, and spreading the message code by using the spreading code of the transmit end; and performing envelope modulation on an optical signal by using the spread message code, transmitting the optical signal after the envelope modulation to the receive end, choosing, by the receive end, the spreading code of the receive end to despread the message code to obtain the original message code of the transmit end, and obtaining a corresponding wavelength according to the spreading code of the receive end; and performing, by the receive end, the following steps:

receiving, by the receive end for receiving an optical signal resource, the optical signal after the envelope modulation of the transmit end;

removing an optical wave of the optical signal to obtain the spread message code of the transmit end; and choosing the spreading code of the receive end, performing sliding despreading on the received spread message code by using the spreading code of the receive end, when the spreading code of the receive end is the same as the spreading code of the transmit end, obtaining the original message code of the transmit end, and obtaining a corresponding wavelength according to the spreading code of the receive end.

Compared with the prior art, the foregoing technical solution of the present invention has the following advantages.

In the present invention, a spreading code having a correspondence with a wavelength is used to spread and despread a message code. Due to spectrum spreading, a modulation depth of an amplitude modulated signal may be greatly reduced to nearly prevent an envelope modulated signal from affecting a main signal. In addition, after spectrum spreading, the transmit end may use a low-pass filter with a fixed bandwidth to further reduce the impact on the main signal, the receive end may use the low-pass filter with a fixed bandwidth on an envelope modulated signal path, so that the design and implementation of the involved filter are further facilitated, thereby significantly reducing the complexity of hardware design, and wavelength labeling is implemented by using a spreading code.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not intended to limit the present invention.

Figure 4:
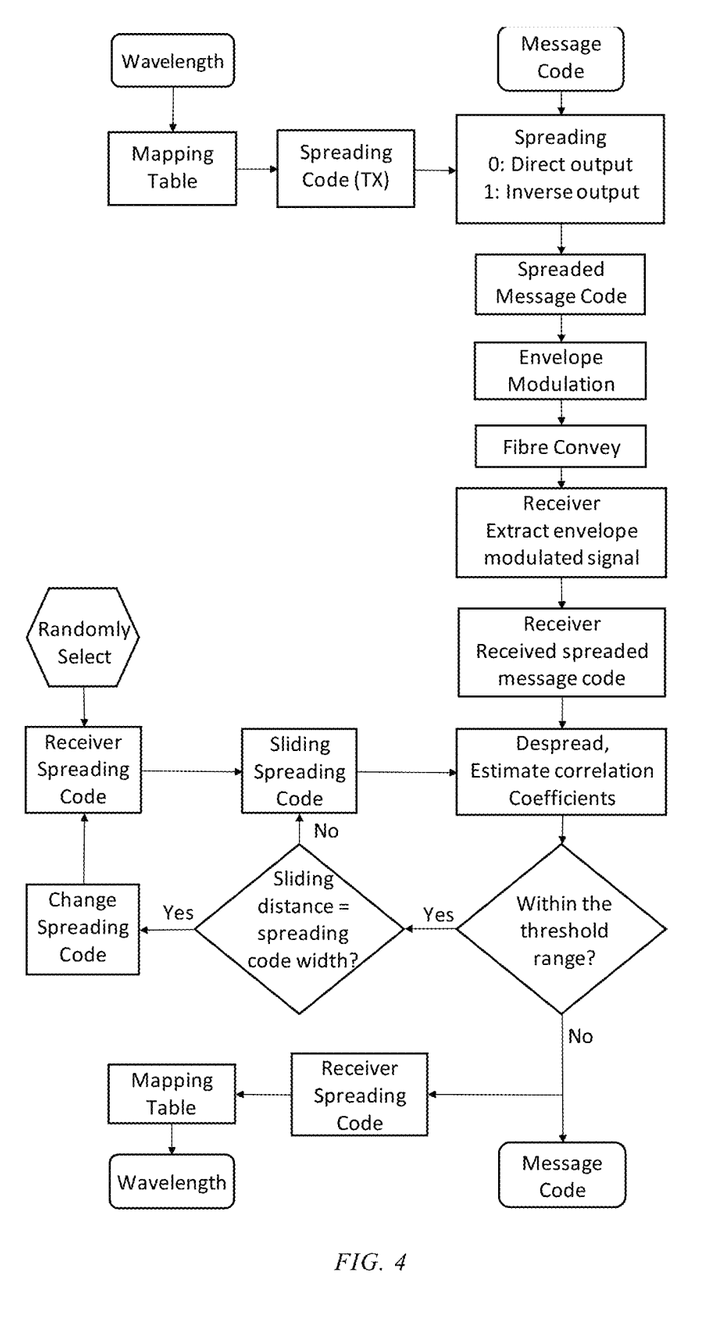
FIG. 4 is a schematic flowchart of a method for labeling an optical fiber wavelength according to an embodiment of the present invention.
Figure 5:
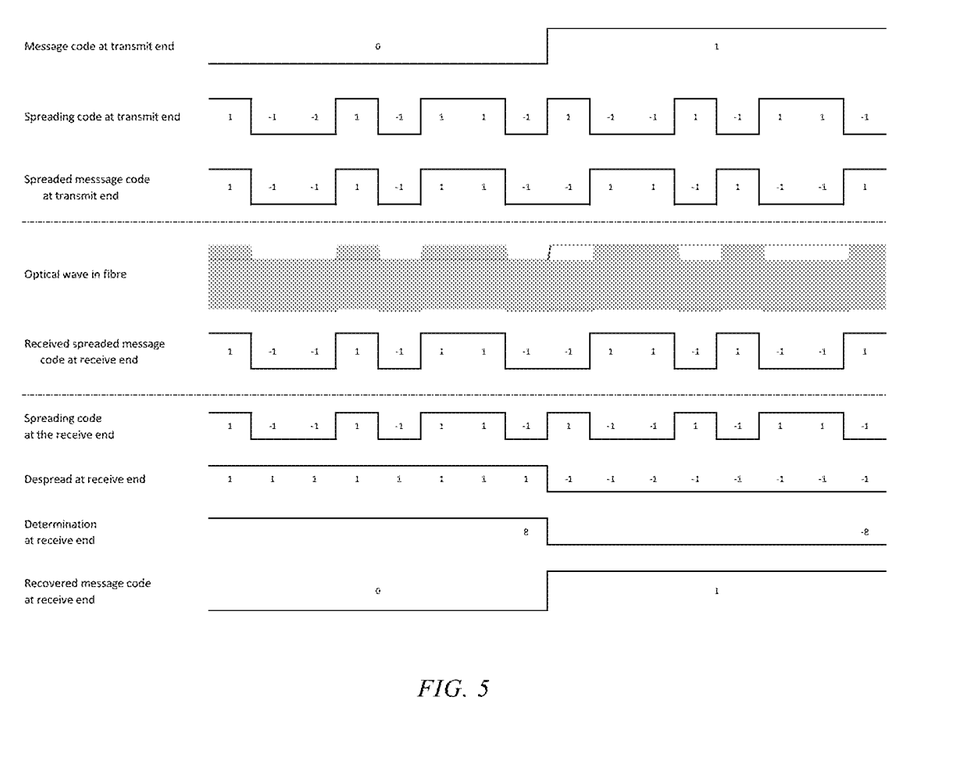
FIG. 5 is a schematic diagram of a communication process between a transmit end and a receive end according to an embodiment of the present invention.

To better understand a method for labeling an optical fiber wavelength according to embodiments disclosed in the present invention, the present invention provides a flowchart of the method for labeling an optical fiber wavelength shown in FIG. 4. As can be seen from FIG. 4, there are mainly two execution bodies in the method for labeling an optical fiber wavelength in the present invention. The two execution bodies are a transmit end and a receive end. To transfer a spreading code from the transmit end to the receive end, the spreading code is embedded in a transmitted envelope modulated signal, and direct spectrum spreading is used. FIG. 5 is a schematic diagram of a communication process between the transmit end and the receive end.

With reference to FIG. 4 and FIG. 5, the method for labeling an optical fiber wavelength according to an embodiment in the present invention specifically includes the following steps:

S100: Deploy a spreading code on each of a transmit end and a receive end.

For example, a wavelength is labeled by using a spreading code. A group of spreading codes are chosen to correspond one to one to optical wave wavelengths that need to be labeled. Such a correspondence is predefined and same at the transmit end and the receive end. The transmit end transmits a corresponding spreading code according to a wavelength of the transmit end, and the receive end inversely deduces a corresponding optical wave wavelength according to the detected spreading code. The spreading code may be an orthogonal code, for example, a Walsh code, or may be a pseudorandom sequence, for example, an m sequence. For example, FIG. 6 is a diagram of a correspondence between a wavelength and a spreading code.

Figure 6:
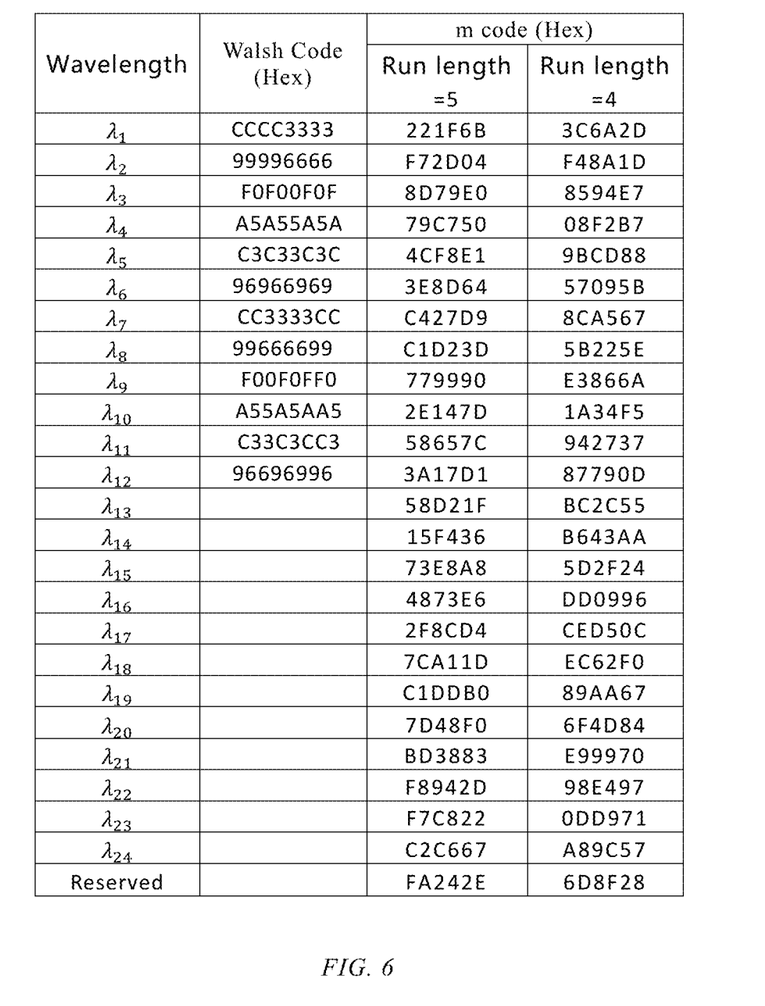
FIG. 6 is a diagram of correspondence between a wavelength and a spreading code according to an embodiment of the present invention.
Figure 7:
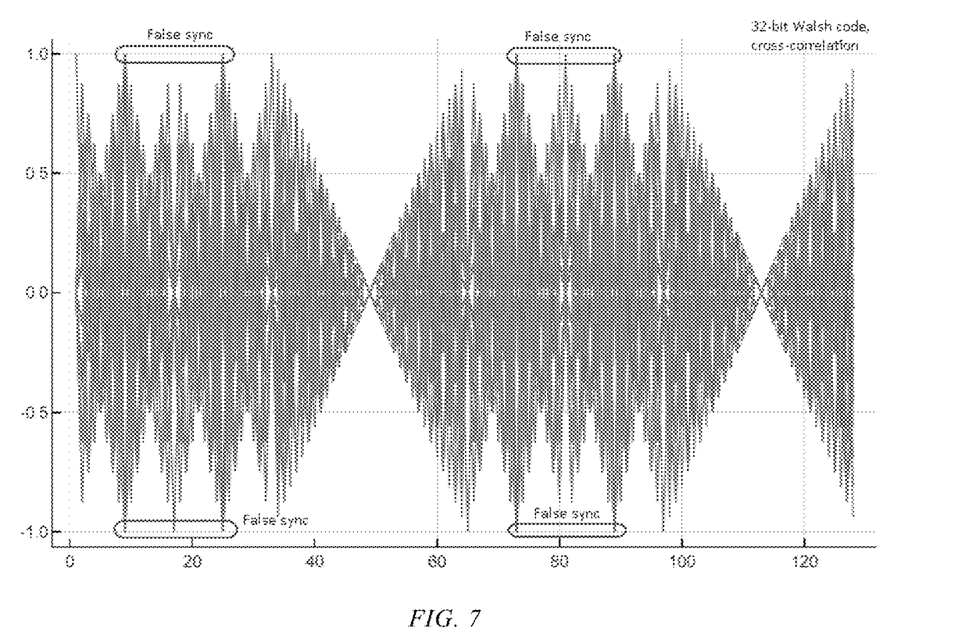
FIG. 7 is a schematic diagram of a sliding cross-correlation coefficient of a Walsh code according to an embodiment of the present invention.
Figure 8:
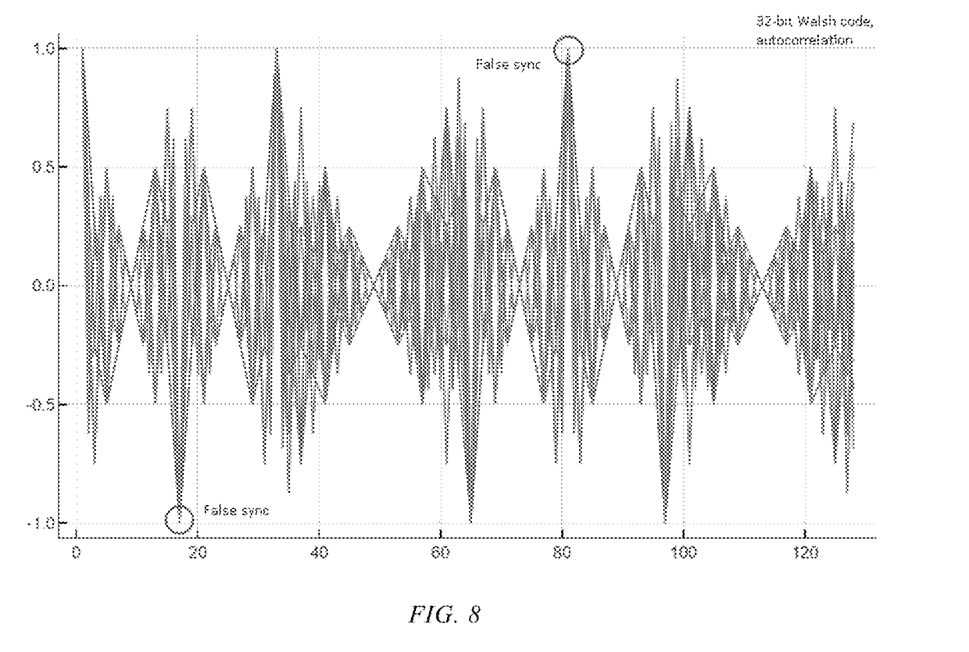
FIG. 8 is a schematic diagram of a sliding autocorrelation coefficient of a Walsh code according to an embodiment of the present invention.

For example, 12 32-bit Walsh codes in FIG. 6 are selected from 31 available codes. The remaining unused codes include one code with an autocorrelation coefficient having 16 maximum values, two codes with an autocorrelation coefficient having 8 maximum values and 8 minimum values, four codes with an autocorrelation coefficient having 4 maximum values and 4 minimum values, eight codes with an autocorrelation coefficient having 2 maximum values and 2 minimum values, two codes with a run-length of 1 and a run-length of 16, and two codes with an autocorrelation coefficient having two approximate maximum values (that is, 28). These unused codes are prone to misjudgment when the receive end captures the spreading code, require additional steps for confirmation, and therefore are temporarily not used. Walsh has adequate cross-correlation. Different Walsh codes are completely orthogonal, and a cross-correlation coefficient is zero. However, a sliding cross-correlation coefficient and a sliding autocorrelation coefficient after the Walsh codes are delayed are not both zero, or even a correlation coefficient is equal to 1 (that is, false synchronization), as shown in FIG. 7 and FIG. 8.

Figure 9:
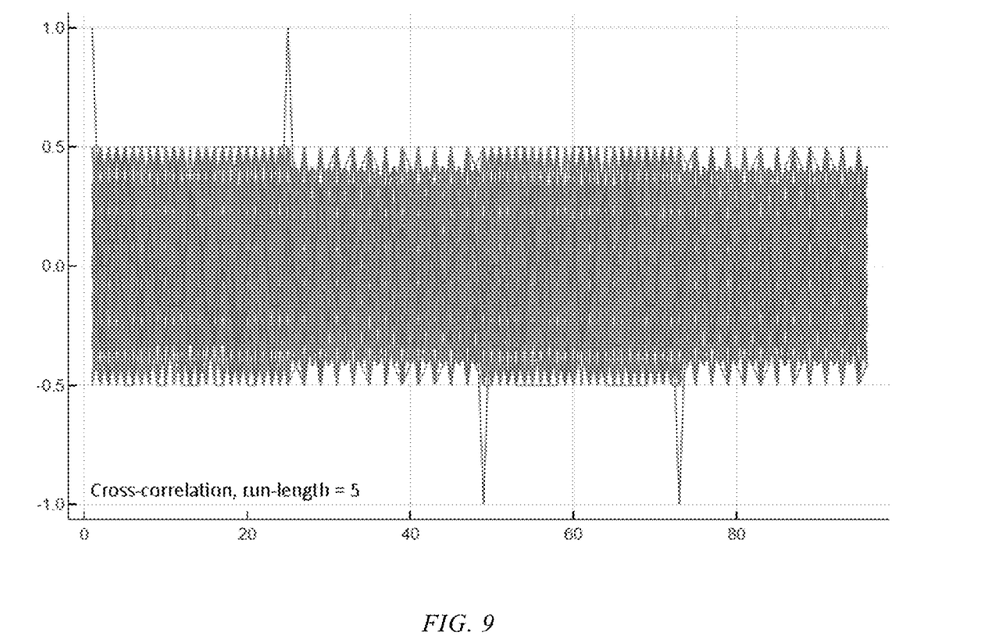
FIG. 9 is a schematic diagram of a sliding cross-correlation coefficient of a selected m code with a run-length of 5 according to an embodiment of the present invention.
Figure 10:
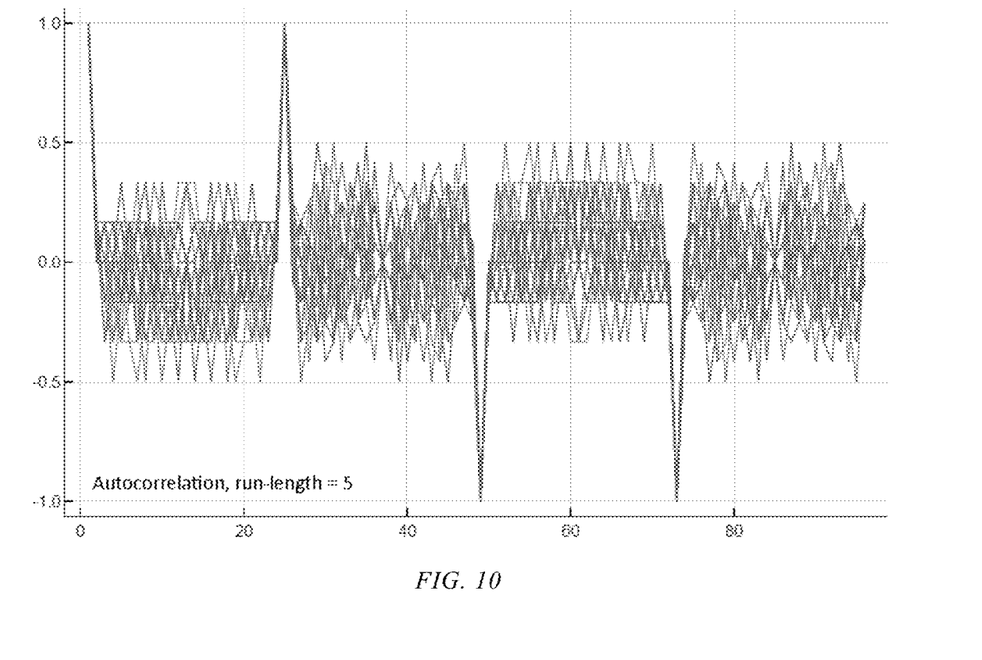
FIG. 10 is a schematic diagram of a sliding autocorrelation coefficient of a selected m code with a run-length of 5 according to an embodiment of the present invention.

For example, 25 24-bit m codes in FIG. 6 are selected from pseudorandom codes generated in a case that an initial value of a primitive polynomial $x^{24}+x^7+x^2+x+1$ is 0x800000. The run-lengths are respectively 1, 2, 3, 4, 5 and 1, 2, 3, 4, and respectively correspond to a run-length of 5 and a run-length of 4. Two adjacent codes have an interval of at least 144. Wavelengths of two sets of 12 waves may be labeled, while still one code is reserved for spreading and despreading and is not used for labeling a wavelength. The selected m codes are not completely orthogonal. However, neither of the sliding cross-correlation coefficient and the sliding autocorrelation coefficient is greater than 0.5, and false synchronization is avoided. FIG. 9 shows a relationship between a sliding cross-correlation coefficient and a sliding step of an m code with a run-length of 5. A line with an autocorrelation coefficient being 1 is an autocorrelation coefficient, and is used for showing different sliding step areas. FIG. 10 shows a sliding autocorrelation coefficient of an m code with a run-length of 5. It can be seen that the autocorrelation coefficient is −1 or +1 only in the case of synchronization, and is not greater than 0.5 in other cases. For 25 m codes selected in FIG. 6, all $2^{24}-1$ codes generated from the primitive polynomial are not exhausted. That is, more m codes satisfying a condition may be found if necessary.

For example, Manchester encoding is usually performed on an envelope modulated signal source before transmission. In a message code transmitted in this manner, a quantity of consecutive 0s or 1s does not exceed 2. A message code "00110" containing 5 bits is used as a test code to calculate a correlation coefficient. A spread test code is:

$$z=(z_1, z_2, \ldots, z_n, z_{n+1}, z_{n+2}, \ldots, z_{5n})=(x_1, x_2, \ldots, x_n, x_1,$$
$$x_2, \ldots, x_n, -x_1, -x_2, \ldots, -x_n, -x_1, -x_2, \ldots, -x_n,$$
$$x_1, x_2, \ldots, x_n).$$

A sliding cross-correlation coefficient between two spreading codes and a sliding autocorrelation coefficient of one spreading code are respectively defined as (1) and (2):

$$\rho(z, y, j) = \frac{1}{n}\sum_{i=1}^{n} z_{i+j} y_i, \; j = 0,1,2,3, \ldots 4n-1, \text{ and} \quad (1)$$

$$\rho(z, x, j) = \frac{1}{n}\sum_{i=1}^{n} z_{i+j} x_i, \; j = 0,1,2,3, \ldots 4n-1, \; j \notin \{n, 2n, 3n\}. \quad (2)$$

In the formulae, x and Y are two spreading codes, and $x_i$, $y_i \in \{-1,+1\}$, i=1, 2, 3, . . . n. The smaller the sliding cross-correlation coefficient between two codes is, the better, and the smaller the sliding autocorrelation coefficient of one code is, the better.

S200: The transmit end transmits a message code, and spreads the message code by using the spreading code of the transmit end.

For example, referring to FIG. 5, spreading the message code by using the spreading code of the transmit end includes the following steps:

A code element of the message code is defined as "0" and/or "1". For example, the message code is 01.

A spreading code $x=(x_1, x_2, x_3, \ldots, x_i, x_n)$ is selected, where $x_i \in \{-1,+1\}$, i=1, 2, 3, . . . n. For example, the spreading code of the transmit end is +1−1−1+1−1+1+1−1. To facilitate calculation, in related coefficients, "−1" is used to replace 0, and "+1" is used to replace 1. A spreading code +1−1−1+1−1+1+1−1 with a high code rate is used to perform spectrum spreading on an original message code 01. When the message code is "0", the spreading code $x_i$ is output. When the message code is "1", the spreading code $x_i$ is negated for output. That is, it is obtained that the spread message code is +1−1−1+1−1+1+1−1−1+1+1−1+1−1−1+1.

S300: Perform envelope modulation on an optical signal by using the spread message code, and transmit the optical signal after the envelope modulation to the receive end.

For example, the envelope modulation is to modulate a spread relatively high-speed code with a high-frequency component removed on the amplitude of a main signal, that is, on the top of the main signal. Due to spectrum spreading, a modulation depth may be very small, so that the impact on the main signal is nearly avoided.

Figure 11:
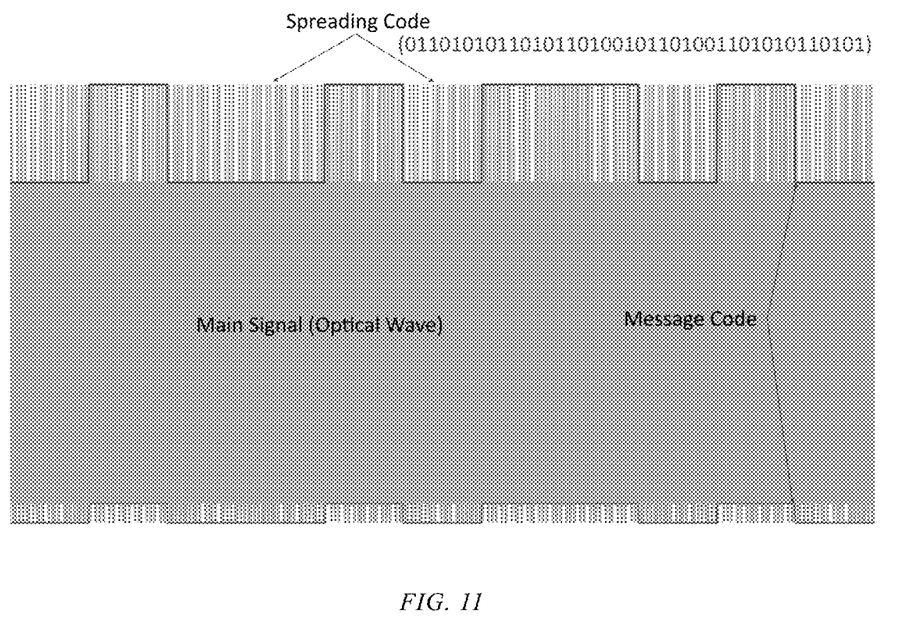
FIG. 11 is a schematic diagram of an optical wave signal after envelope modulation according to an embodiment of the present invention.

S400: The receive end for receiving an optical signal resource receives the optical signal after the envelope modulation of the transmit end, as shown in FIG. 11.

S500: The receive end removes an optical wave of the optical signal to obtain the spread message code of the transmit end.

S600: Choose the spreading code of the receive end, perform sliding despreading on the received spread message code by using the spreading code of the receive end, when the spreading code of the receive end is the same as the spreading code of the transmit end, obtain the original message code of the transmit end, and obtain a corresponding wavelength according to the spreading code of the receive end.

For example, the performing sliding despreading on the received spread message code by using the spreading code of the receive end includes: multiplying the spreading code of the receive end by the received spread message code bit by bit, calculating a nonnormalized cross-correlation coefficient between two bits "0" and "1", and determining, according to the cross-correlation coefficient between the two bits, whether the spreading code of the receive end is the same as the spreading code of the transmit end. Specifically, a threshold is first defined. For example, thresholds are −6 and 6. Then all code elements of the two bits "0" and "1" are separately added to calculate the cross-correlation coefficient between the two bits. It is determined whether the cross-correlation coefficient is within a range of the threshold. If a determination result is no, the spreading code of the receive end is the same as the spreading code of the transmit end. That is, the original message code of the transmit end is obtained, and a corresponding wavelength is obtained according to the spreading code of the receive end. If a determination result is yes, the spreading code of the receive end is different from the spreading code of the transmit end. In this case, it continues to be determined whether a sliding distance of the spreading code of the receive end is equal to a bit width of the spreading code. If a determination result is yes, the spreading code of the receive end is changed to continue to perform the step of sliding spreading. If a determination result is no, the original spreading code of the receive end is used to continue to perform the step of sliding spreading. For example, a cross-correlation coefficient obtained by adding all code elements of "0" is 8. A cross-correlation coefficient obtained by adding all code elements of "1" is −8, the cross-correlation coefficient −8 is less than −6 and the cross-correlation coefficient 8 is greater than 6. Therefore, the spreading code of the receive end is the same as the spreading code of the transmit end. In this case, an optical fiber wavelength corresponding to the original message code of 01 and the spreading code may be obtained.

Figure 12:
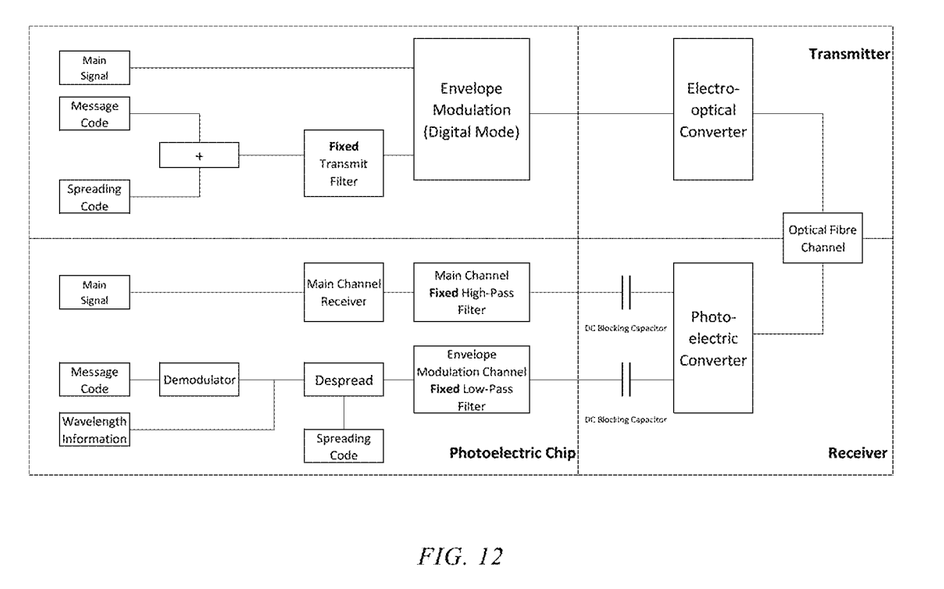
FIG. 12 is a diagram of a hardware principle according to an embodiment of the present invention.

Further, FIG. 11 is a schematic diagram of an optical wave signal after envelope modulation according to an embodiment of the present invention, and FIG. 12 shows a diagram of a hardware principle.

Each spreading code corresponds to a specific wavelength. The message code is spread by using the spreading code to obtain the spread message code.

A transmit filter is a low-pass filter. A high-frequency component of the spread message code may be filtered out to reduce the impact on the main signal. Because the message code and the spreading code have fixed quantities of bits and fixed code rates, the bandwidth of the low-pass filter is also fixed.

The envelope modulation is to modulate a message code with a high-frequency component removed on the amplitude of the main signal, that is, on the top of the main signal. Due to spectrum spreading. A modulation depth may be very small. The impact on the main signal is nearly avoided.

Electro-optical conversion, an optical fiber signal, and photoelectric conversion achieve the transmission of an envelope modulated signal through an optical wave.

At the receive end, the main signal and the envelope modulated signal are split into two channels and separately filtered with different filters.

A modulation depth of the envelope modulated signal is very small, and the impact on the main signal is very small. Therefore, an original blocking capacitor on a main channel may be kept unchanged. An original cutoff frequency does not change, and a subsequent main channel receiver also does not change.

On an envelope modulation channel, in addition to the blocking capacitor, a low-pass filter with a fixed bandwidth may be used to filter out noise and residue at the envelope modulated signal after the main signal has been photoelectrically converted.

Despreading is to recover the spread envelope modulated signal using the spreading code. If the noise and the residue of the main signal are not filtered out thoroughly, because spectrum spreading has a processing gain, the original envelope modulated signal may also be recovered after despreading.

The recovered envelope modulated signal is demodulated, that is, an operation such as data decision, the original message code may be obtained.

The spreading code is used in spreading and despreading. A correlation detection peak occurs and envelope modulation information can be accurately demodulated only when the same spreading code is used at the transmit end and the receive end. That is, the receive end may determine a spreading code used by the transmit end. According to a predefined correspondence, the receive end knows a wavelength of an optical fiber transmitted by the transmit end. In this way, the method for labeling a wavelength by using a spreading code is completed.

In the present invention, a spreading code having a correspondence with a wavelength is used to spread and despread a message code. Due to spectrum spreading, a modulation depth of an amplitude modulated signal may be greatly reduced to nearly prevent an envelope modulated signal from affecting a main signal. In addition, after spectrum spreading, the transmit end may use a low-pass filter with a fixed bandwidth to further reduce the impact on the main signal, and the receive end may use the low-pass filter with a fixed bandwidth on an envelope modulated signal path, so that involved filter design and implementation are further facilitated, thereby significantly reducing the complexity of hardware design, and wavelength labeling is implemented by using a spreading code.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a compact disc read-only memory (CD-ROM), an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived therefrom still fall within the protection scope of the invention of the present invention.

What is claimed is:

1. A method for labeling an optical fiber wavelength by a transmit end, comprising:
deploying a spreading code on each of a transmit end and a receive end;
transmitting a message code, and spreading the message code by using the spreading code of the transmit end; and
performing envelope modulation on an optical signal by using the spread message code, transmitting the optical signal after the envelope modulation to the receive end, choosing, by the receive end, the spreading code of the receive end to despread the message code to obtain the original message code of the transmit end, and obtaining a corresponding wavelength according to the spreading code of the receive end,
wherein a correspondence is established between each of the spreading code of the transmit end and the spreading code of the receive end and a corresponding wavelength in a wavelength table.

2. The method for labeling an optical fiber wavelength by a transmit end according to claim 1, wherein the spreading code is an orthogonal code or a pseudorandom sequence.

3. The method for labeling an optical fiber wavelength by a transmit end according to claim 1, wherein the spreading the message code by using the spreading code of the transmit end comprises:
defining a code element of the message code as "0" and/or "1";
selecting a spreading code $x=(x_1, x_2, x_3, \ldots, x_i, \ldots, x_n)$, wherein $x_i \in \{-1, +1\}$, $i=1, 2, 3, \ldots n$; and
when the message code is "0", outputting the spreading code $x_i$, and when the message code is "1", negating the spreading code $x_i$ for output.

4. The method for labeling an optical fiber wavelength by a transmit end according to claim 1, wherein the choosing, by the receive end, the spreading code of the receive end to despread the message code comprises:
choosing the spreading code of the receive end, and performing sliding despreading on the received spread message code by using the spreading code of the receive end, wherein when the spreading code of the receive end is the same as the spreading code of the transmit end, the original message code of the transmit end is accurately demodulated.

5. The method for labeling an optical fiber wavelength by a transmit end according to claim 4, wherein the performing sliding despreading on the received spread message code by using the spreading code of the receive end comprises:
multiplying the spreading code of the receive end by the received spread message code bit by bit, calculating a nonnormalized cross-correlation coefficient between two bits "0" and "1", and determining, according to the cross-correlation coefficient between the two bits, whether the spreading code of the receive end is the same as the spreading code of the transmit end.

6. The method for labeling an optical fiber wavelength by a transmit end according to claim 5, wherein the calculating a nonnormalized cross-correlation coefficient between two bits "0" and "1", and determining, according to the cross-correlation coefficient between the two bits, whether the spreading code of the receive end is the same as the spreading code of the transmit end comprises:
defining a threshold;
separately adding all code elements of the two bits "0" and "1" to calculate the cross-correlation coefficient between the two bits, and determining whether the cross-correlation coefficient is within a range of the threshold, wherein
if a determination result is no, the spreading code of the receive end is the same as the spreading code of the transmit end; or
if a determination result is yes, the spreading code of the receive end is different from the spreading code of the transmit end.

7. The method for labeling an optical fiber wavelength by a transmit end according to claim 6, wherein after it is determined that the spreading code of the receive end is different from the spreading code of the transmit end, it continues to be determined whether a sliding distance of the spreading code of the receive end is equal to a bit width of the spreading code, and if a determination result is yes, the spreading code of the receive end is changed to continue to perform the step of sliding spreading, or if a determination result is no, the original spreading code of the receive end is used to continue to perform the step of sliding spreading.

8. A method for demodulating an optical fiber wavelength labeled by a transmit end by a receive end, comprising:
  receiving, by a receive end for receiving an optical signal resource, an optical signal after envelope modulation from a transmit end;
  removing an optical wave of the optical signal to obtain a spread message code of the transmit end; and
  choosing a spreading code of the receive end, performing sliding despreading on the received spread message code by using the spreading code of the receive end, when the spreading code of the receive end is the same as a spreading code of the transmit end, obtaining the original message code of the transmit end, and obtaining a corresponding wavelength according to the spreading code of the receive end,
  wherein a correspondence is established between each of the spreading code of the transmit end and the spreading code of the receive end and a corresponding wavelength in a wavelength table.

9. A method for labeling an optical fiber wavelength by a system, wherein the system comprises a transmit end and a receive end, and the method comprises:
  performing, by the transmit end, steps of:
  deploying a spreading code on each of the transmit end and the receive end;
  transmitting a message code, and spreading the message code by using the spreading code of the transmit end; and
  performing envelope modulation on an optical signal by using the spread message code, transmitting the optical signal after the envelope modulation to the receive end, choosing, by the receive end, the spreading code of the receive end to despread the message code to obtain the original message code of the transmit end, and obtaining a corresponding wavelength according to the spreading code of the receive end; and
  performing, by the receive end, steps of:
  receiving, by the receive end for receiving an optical signal resource, the optical signal after the envelope modulation of the transmit end;
  removing an optical wave of the optical signal to obtain the spread message code of the transmit end; and
  choosing the spreading code of the receive end, performing sliding despreading on the received spread message code by using the spreading code of the receive end, when the spreading code of the receive end is the same as the spreading code of the transmit end, obtaining the original message code of the transmit end, and obtaining a corresponding wavelength according to the spreading code of the receive end,
  wherein a correspondence is established between each of the spreading code of the transmit end and the spreading code of the receive end and a corresponding wavelength in a wavelength table.

* * * * *